US009030435B2

(12) United States Patent
Chang

(10) Patent No.: US 9,030,435 B2
(45) Date of Patent: *May 12, 2015

(54) TOUCH INPUT DEVICE WITH BUTTON FUNCTION

(71) Applicant: Primax Electronics Ltd., Niehu, Taipei (TW)

(72) Inventor: A-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,019

(22) Filed: Oct. 9, 2013

(65) Prior Publication Data

US 2015/0015496 A1 Jan. 15, 2015

(30) Foreign Application Priority Data

Jul. 10, 2013 (TW) .............................. 102213058 U

(51) Int. Cl.
*G06F 3/041* (2006.01)
(52) U.S. Cl.
CPC ...... *G06F 3/041* (2013.01); *G06F 2203/04105* (2013.01)
(58) Field of Classification Search
CPC ..... G06F 3/0416; G06F 3/0412; G06F 3/041; G06F 3/048; G06F 3/0488; G06F 3/04883
USPC ............ 345/156, 173–175; 178/18.01–18.07
See application file for complete search history.

(56) References Cited

U.S. PATENT DOCUMENTS

| 8,780,201 B1* | 7/2014 | Scalisi et al. ................... 348/143 |
| 2014/0180644 A1* | 6/2014 | Maturana et al. ................. 703/1 |
| 2014/0210735 A1* | 7/2014 | Chang ........................... 345/173 |
| 2014/0222526 A1* | 8/2014 | Shakil et al. ................. 705/7.38 |

* cited by examiner

*Primary Examiner* — Ricardo L Osorio
(74) *Attorney, Agent, or Firm* — Kirton McConkie; Evan R. Witt

(57) ABSTRACT

A touch input device with a button function is provided. The touch input device includes a base member, a touch module, a triggering switch, a linking module, and plural movable pads. The plural movable pads are disposed on the linking module. The linking module is fixed on the base member through a fixing part. Moreover, the linking module is located near the triggering switch, which is disposed on the base member. When the touch module is depressed, the linking module is pushed by the plural movable pads. Consequently, the linking module is swung by using the fixing part as a fulcrum, and the triggering switch is pushed by the linking module. Since the lever arm of the linking module is longer than the lever arm of the prior technology, the touch module is depressed by a smaller force.

10 Claims, 6 Drawing Sheets

TOUCH INPUT DEVICE WITH BUTTON FUNCTION

FIELD OF THE INVENTION

The present invention relates to a touch input device, and more particularly to a touch input device with a button function.

BACKGROUND OF THE INVENTION

The applications of touch input devices are very extensive. In the early stage, a touch input device is installed on a notebook computer. By operating the touch input device, the movement of a cursor may be controlled or a corresponding icon of a user interface may be clicked without the need of using a mouse to operate the notebook computer. With the advance of science and technology, a physical button may be integrated into the touch input device, so that the touch input device has a button function. Under this circumstance, it is not necessary to install plural physical buttons on the peripheral area of the touch input device. Since the physical button is integrated into the touch input device, the layout space is saved and the outward appearance is aesthetically-pleasing.

Hereinafter, a conventional touch input device with a button function will be illustrated. For example, this touch input device is disclosed in US Patent Publication No. 2011/0310029. The touch input device comprises a housing body, a touch sensitive layer, a triggering switch, plural foot pads, a foot bar, and a hinge structure. The triggering switch, the foot bar and the hinge structure are disposed on a frame of the touch input device. When a downward force is received by the conventional touch input device, the touch sensitive layer detects the downward force and correspondingly generates a first signal. Then, the foot bar is pushed by the plural foot pads. In response to the downward force, the foot bar is swung relative to a hinge line of the hinge structure. Consequently, the triggering switch is triggered to generate a second signal. According to the first signal or the second signal, the touch input device outputs a corresponding control signal. According to the control signal, a corresponding command is executed.

For assembling the conventional touch input device having the button function, the triggering switch is firstly disposed on the frame, and the frame is disposed under the touch sensitive layer. When the downward force is received by the conventional touch input device, the triggering switch is moved to a position near the touch sensitive layer. Consequently, a sound box effect occurs within the housing body. Due to the sound box effect, a large collision sound is generated. Moreover, when the downward force is received by the conventional touch input device, the lever arm of swinging the foot bar is equal to the distance between the hinge line of the hinge structure and the plural foot pads. In addition, the distance between the hinge line of the hinge structure and the plural foot pads is very short. As known, the magnitude of a torque is equal to the product of the magnitude of a force multiply the length of a lever arm. Since the distance between the hinge line of the hinge structure and the plural foot pads is very short, the magnitude of the applied force should be large enough to swing the foot bar. From the above discussions, the conventional touch input device wastes energy. Moreover, since the magnitude of the applied force is very large, the collision sound is very large.

Therefore, there is a need of providing a touch input device with a button function in order to reduce the collision sound and save the energy.

SUMMARY OF THE INVENTION

The present invention provides a touch input device with a button function in order to reduce the collision sound.

The present invention also provides a touch input device with a button function in order to save energy.

In accordance with an aspect of the present invention, there is provided a touch input device with a button function. The input device includes a base member, a touch module, a triggering switch, a linking module, and plural movable pads. The base member includes plural perforations. The plural perforations are located at a bottom side of the base member. The touch module is disposed over the base member and covering the base member. When the touch module is touched and a touched position is detected by the touch module, the touch module generates a touch signal. The triggering switch is disposed on the base member. When the touch module is depressed, the triggering switch is triggered to generate a corresponding button signal. The linking module is disposed on the base member. When the touch module is depressed, the linking module is swung relative to the touch module to trigger the triggering switch. The plural movable pads are disposed on the linking module, and penetrated through the corresponding perforations of the base member to be exposed outside the base member. When the touch module is depressed, the plural movable pads are moved relative to the corresponding perforations to push the linking module, so that the linking module is correspondingly swung.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For eliminating the drawbacks encountered from the prior art, the present invention provides a touch input device with a button function.

Figure 1:
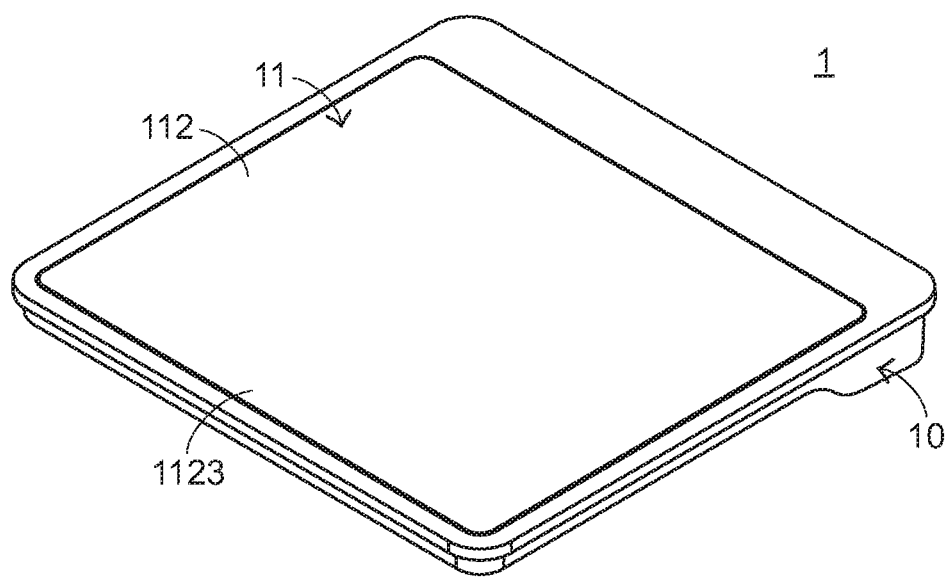
FIG. 1 is a schematic perspective view illustrating the outer appearance of a touch input device with a button function according to an embodiment of the present invention.
Figure 2:
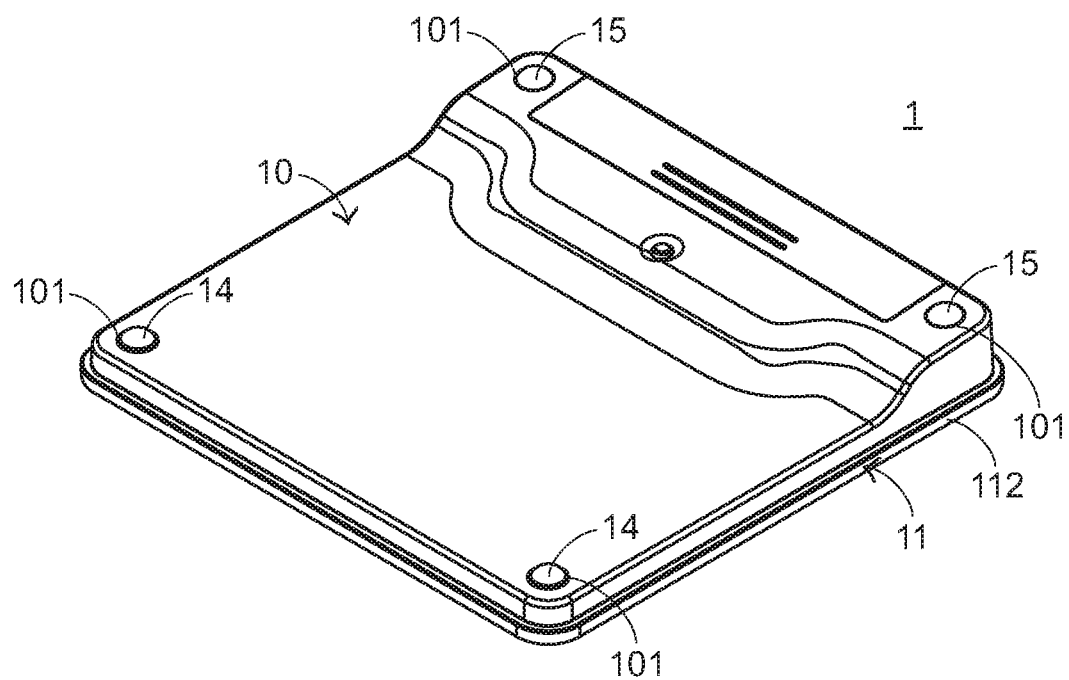
FIG. 2 is a schematic perspective view illustrating the touch input device of FIG. 1 and taken along another viewpoint

Hereinafter, the structure of a touch input device with a button function according to an embodiment of the present invention will be illustrated with reference to FIGS. 1 and 2. FIG. 1 is a schematic perspective view illustrating the outer appearance of a touch input device with a button function according to an embodiment of the present invention. FIG. 2 is a schematic perspective view illustrating the touch input device of FIG. 1 and taken along another viewpoint. The touch input device 1 is in communication with a computer system (not shown). By operating the touch input device 1, the movement of a cursor (not shown) of the computer system may be controlled or a corresponding icon (not shown) of the computer system may be clicked. As shown in FIGS. 1 and 2, the touch input device 1 comprises a base member 10, a touch module 11, a triggering switch 12 (see FIG. 5), a linking module 13 (see FIG. 4), plural movable pads 14, and plural fixed pads 15. The base member 10 comprises plural perforations 101. In FIG. 2, four perforations 101 are shown. These perforations 101 are located at a bottom side of the base member 10. The touch module 11 is disposed over the base member 10 for covering the base member 10. When the touch module 11 is touched by a user and a touched position of the touch module 11 is detected, the touch module 11 generates a touch signal. In this embodiment, the touch module 11 is a capacitive touch sensitive plate. Alternatively, in some other embodiments, the touch module is a resistive touch sensitive plate.

Figure 3:
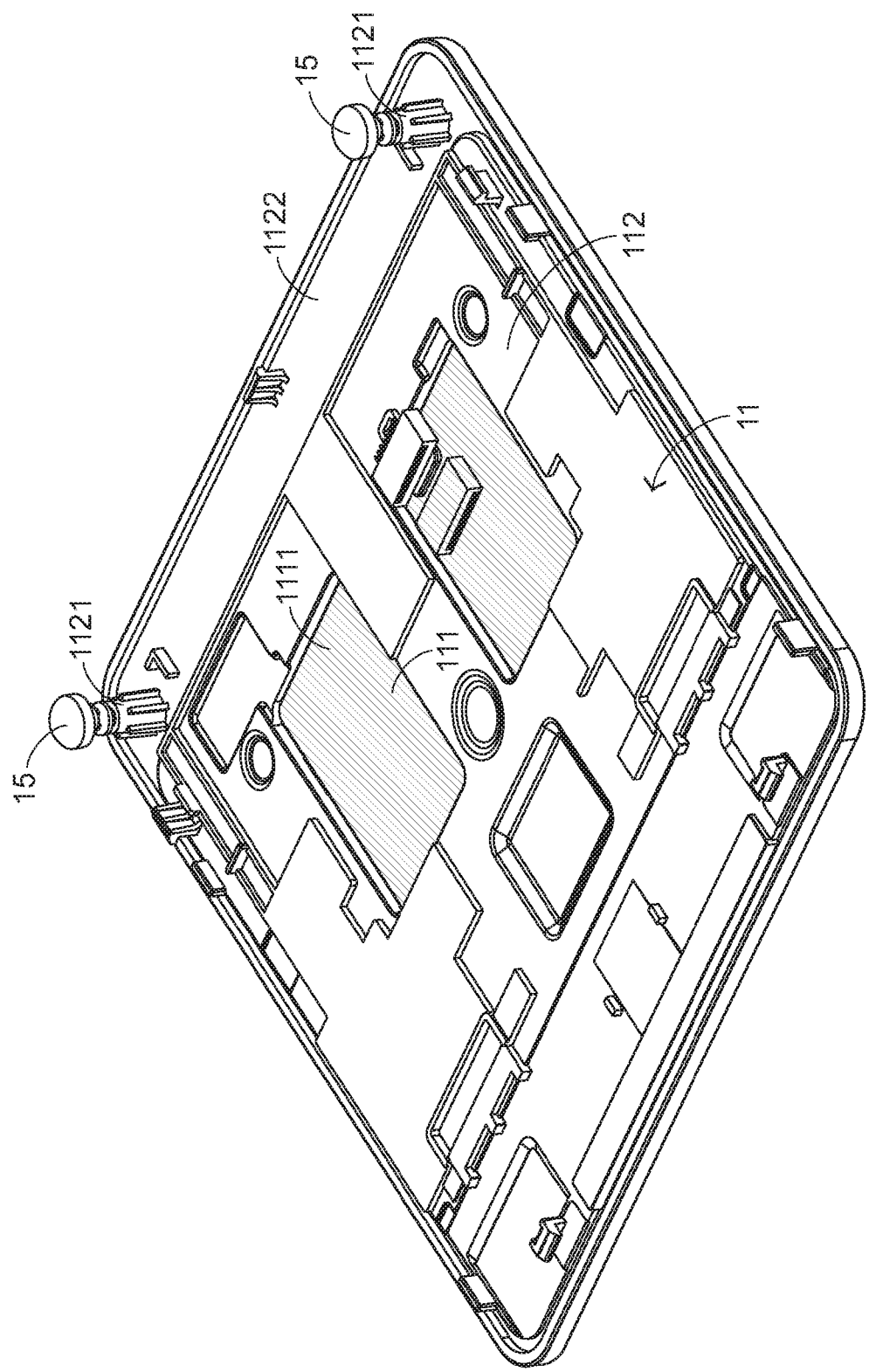
FIG. 3 is a schematic perspective view illustrating the inner structure of the touch module of the touch input device according to the embodiment of the present invention.

FIG. 3 is a schematic perspective view illustrating the inner structure of the touch module of the touch input device according to the embodiment of the present invention. Please refer to FIGS. 1, 2 and 3. The touch module 11 comprises a sensing circuit plate 111 and a protective cover 112. The sensing circuit plate 111 is used for detecting the touched position, thereby generating the corresponding touch signal. According to the touch signal, the cursor of the computer system is correspondingly moved. The protective cover 112 is used for covering the sensing circuit plate 111 in order to protect the sensing circuit plate 111. In addition, a bottom surface 1111 of the sensing circuit plate 111 is partially exposed outside the protective cover 112. When one or more fingers of the user are moved on a top surface 1123 of the protective cover 112, the touched position or the touched positions are detected by the sensing circuit plate 111. Consequently, one or more corresponding touch signals are generated to control the movement of the cursor of the computer system. Moreover, the protective cover 112 comprises plural protrusion posts 1121. The plural protrusion posts 1121 are disposed on a lower portion 1122 of the protective cover 112, and protruded externally from the lower portion 1122 of the protective cover 112. The plural fixed pads 15 are disposed on the plural protrusion posts 1121, respectively. Moreover, the plural fixed pads 15 are penetrated through the corresponding perforations 101 to be exposed outside the base member 10 (see FIG. 2).

Figure 4:
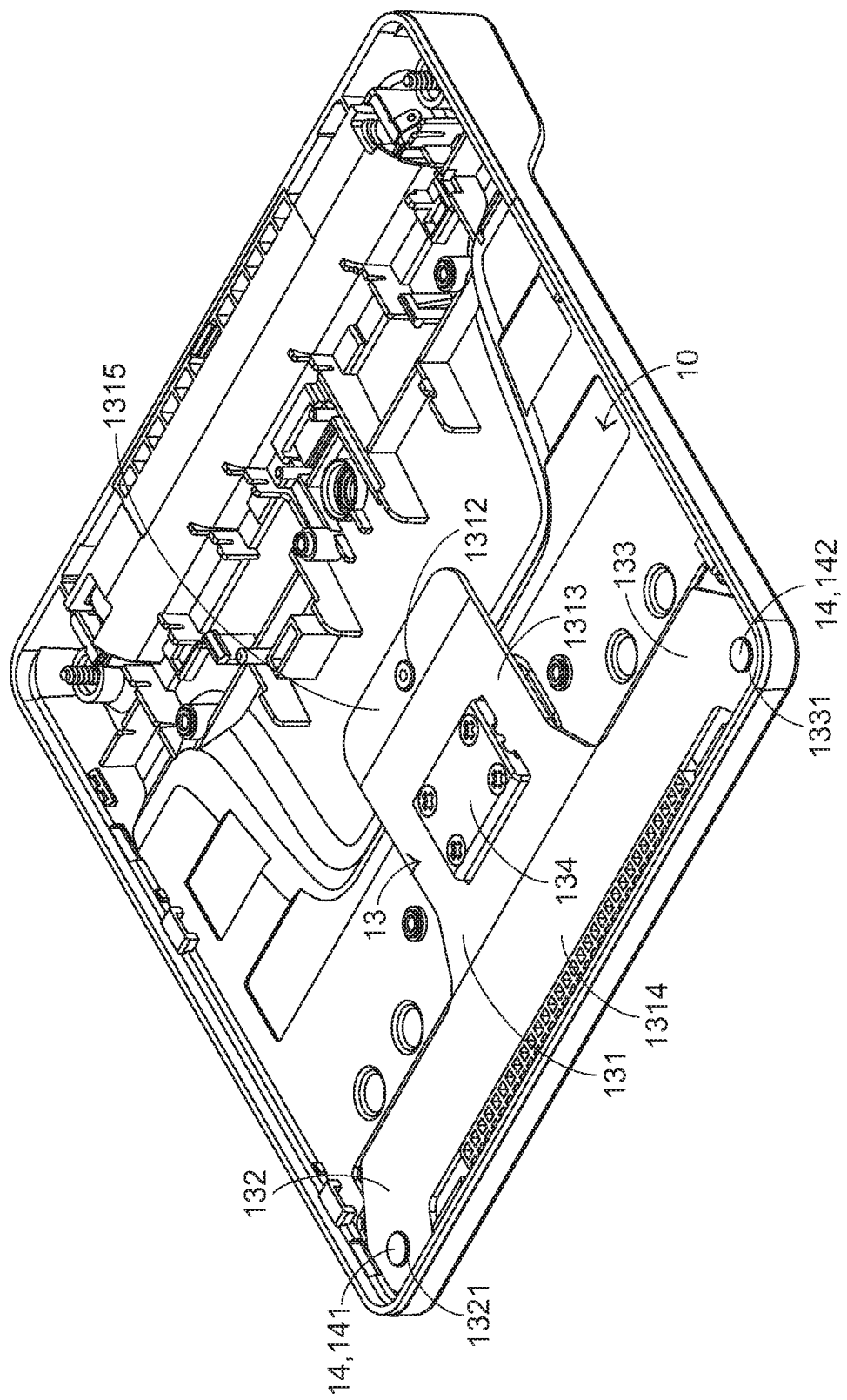
FIG. 4 is a schematic perspective view illustrating some components of the base member of the touch input device according to the embodiment of the present invention.
Figure 5:
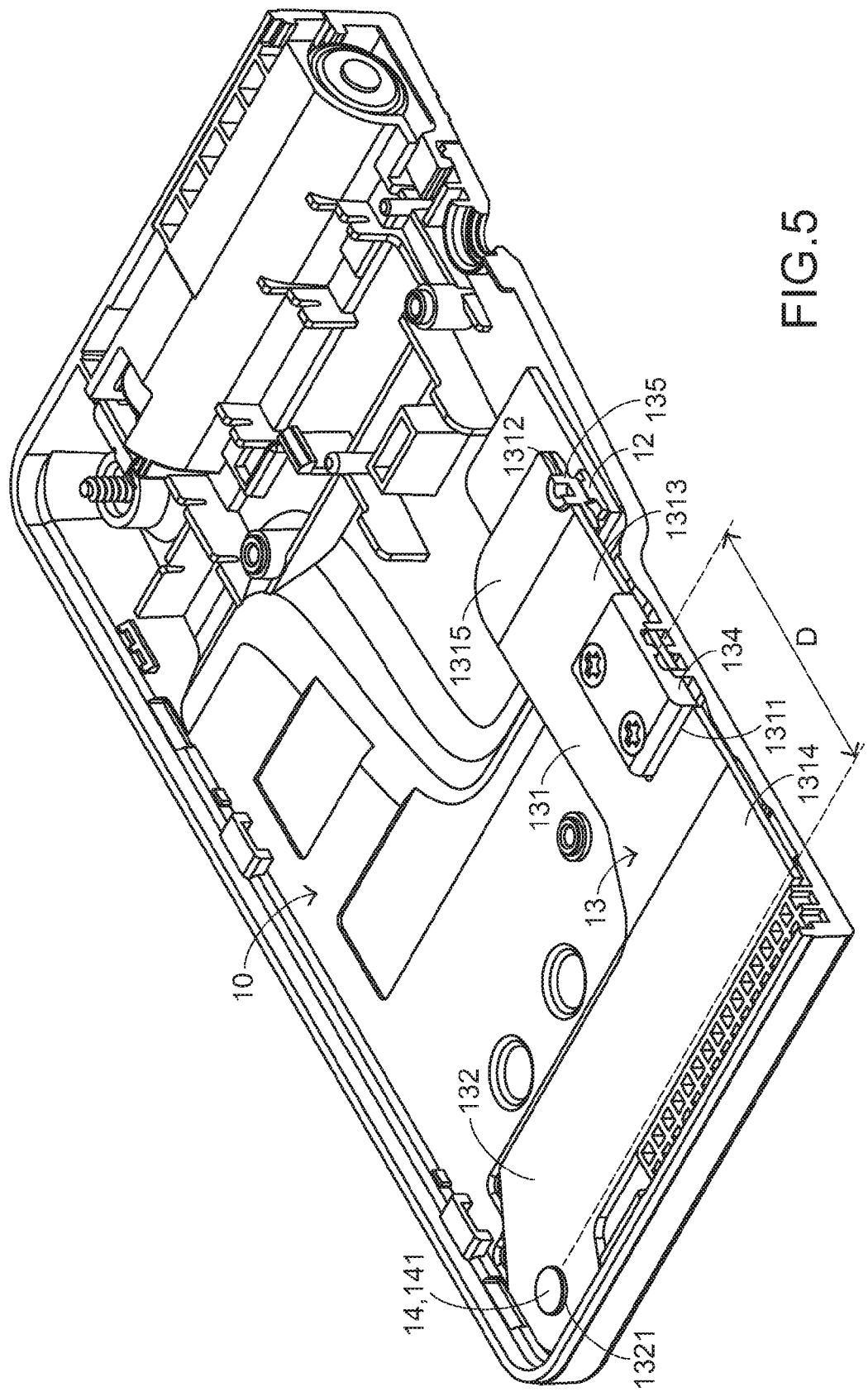
FIG. 5 is a schematic cutaway view illustrating some components of the base member of the touch input device according to the embodiment of the present invention.

FIG. 4 is a schematic perspective view illustrating some components of the base member of the touch input device according to the embodiment of the present invention. FIG. 5 is a schematic cutaway view illustrating some components of the base member of the touch input device according to the embodiment of the present invention. As shown in FIGS. 4 and 5, the triggering switch 12 is disposed on the base member 10. When the touch module 11 (see FIG. 3) is depressed, the triggering switch 12 is triggered to generate a button signal. The linking module 13 is fixed on the base member 10. When the touch module 11 is depressed, the linking module 13 is swung relative to the touch module 11 to trigger the triggering switch 12. A first movable pad 141 and a second movable pad 142 of the plural movable pads 14 are both disposed on the linking module 13. Moreover, the first movable pad 141 and the second movable pad 142 are penetrated through the corresponding perforations 101 and exposed outside the base member 10. When the touch module 11 is depressed, the first movable pad 141 and the second movable pad 142 are moved relative to the corresponding perforations 101. Consequently, the linking module 13 is pushed by the first movable pad 141 and the second movable pad 142 to be swung. In this embodiment, all of the plural movable pads 14 and the plural fixed pads 15 are made of rubbery materials.

Figure 6:
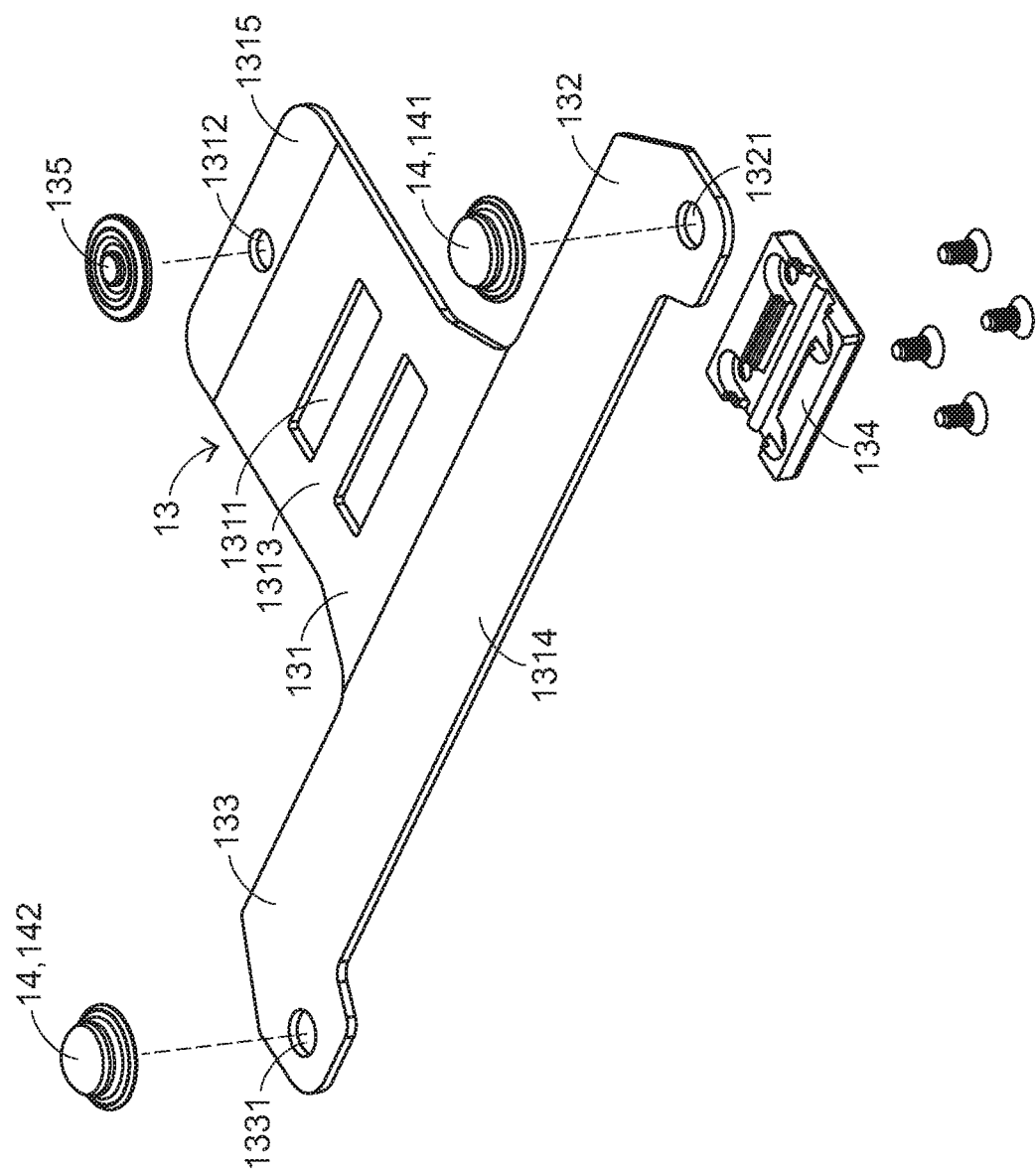
FIG. 6 is a schematic exploded view illustrating the linking module and the plural movable pads of the touch input device according to the embodiment of the present invention.

Hereinafter, the structure of the linking module 13 will be illustrated with reference to FIGS. 4 and 6. FIG. 6 is a schematic exploded view illustrating the linking module and the plural movable pads of the touch input device according to the embodiment of the present invention. As shown in FIGS. 4 and 6, the linking module 13 comprises a linking body 131, a first wing part 132, a second wing part 133, a fixing part 134, and a triggering part 135. The linking body 131 has plural first openings 1311 and a second opening 1312. The plural first openings 1311 are located at a middle region 1313 of the linking body 131. The second opening 1312 is located at a second side 1315 of the linking body 131. The first wing part 132 is located at a first side of the linking body 131 and extended along a first direction (i.e. a leftward direction as shown in FIG. 4). In addition, the first wing part 132 has a third opening 1321. The first movable pad 141 is penetrated through the third opening 1321, and thus fixed on the first wing part 132. On the other hand, the second wing part 133 is located at the first side of the linking body 131 and extended along a second direction (i.e. a rightward direction as shown in FIG. 4). In addition, the second wing part 133 has a fourth opening 1331. The second movable pad 142 is penetrated through the fourth opening 1331, and thus fixed on the second wing part 133.

The fixing part 134 is disposed on the linking body 131, and penetrated through the plural first openings 1311. Consequently, the middle region 1313 of the linking body 131 is fixed on the base member 10 by the fixing part 134. The triggering part 135 is disposed on the second side 1315 of the linking body 131, and penetrated through the second opening 1312. Consequently, the triggering part 135 is fixed on the second side 1315 of the linking body 131. When the second side 1315 of the linking body 131 is swung relative to the touch module 11, the triggering switch 12 is triggered by the triggering part 135. In this embodiment, the first wing part 132 and the second wing part 133 are integrally formed with the linking body 131. Moreover, the linking body 131 is made of a metallic material. The linking body 131 is fixed on the base member 10 by the fixing part 134 through screws. In this embodiment, the triggering part 135 is made of a plastic material.

It is noted that numerous modifications and alterations of the triggering part may be made while retaining the teachings of the invention. For example, in some embodiments, the triggering part is disposed on the second side of the linking body, and extended from the linking body along a direction toward the triggering switch. Moreover, the triggering part is integrally formed with the linking body. That is, the triggering part is also made of a metallic material. When the linking module is swung relative to the touch module, the triggering switch is pushed by the triggering part on the linking body. Consequently, the triggering switch is triggered to generate a corresponding button signal.

From the above discussions, the triggering switch 12 is located near the second side 1315 of the linking body 131. When the touch module 11 is depressed, the second side 1315 of the linking body 131 is swung relative to the touch module 11 by using the fixing part 1314 as a fulcrum. Consequently, the triggering switch 12 is correspondingly triggered.

Figure 7:
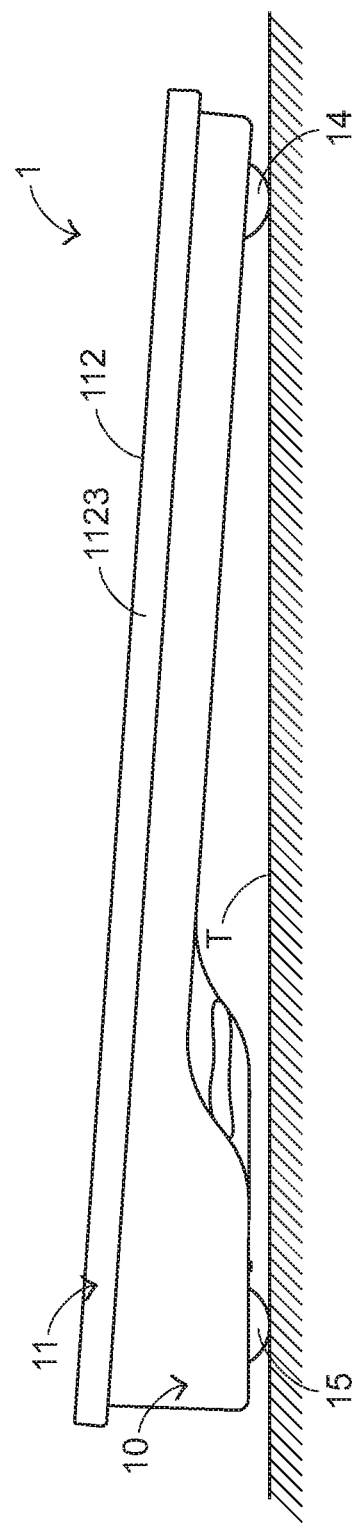
FIG. 7 is a schematic side view illustrating the touch input device according to the embodiment of the present invention.

Now, please refer to FIGS. 3, 4 and 7. FIG. 7 is a schematic side view illustrating the touch input device according to the embodiment of the present invention. As shown in FIG. 7, the base member 10 of the touch input device 1 is placed on a working surface T. In addition, the plural movable pads 14 and the plural fixed pads 15 are all contacted with the working surface T. For implementing the button function, the user's finger may depress the top surface 1123 of the protective cover 112 of the touch module 11. Consequently, the plural movable pads 14 are pushed by the working surface T to be moved relative to the corresponding perforations 101 of the base member 10. Moreover, since the first movable pad 141 or the second movable pad 142 of the plural movable pads 14 is pushed by the first wing part 132 or the second wing part 133, the second side 1315 of the linking body 131 is swung relative to the touch module 11 by using the fixing part 1314 as the fulcrum. Under this circumstance, the triggering part 135 is moved downwardly to push the triggering switch 12, and thus the button signal corresponding to the touched position is generated by the triggering switch 12. According to the touched position, the sensing circuit plate 111 determines whether the button signal is a left button signal or a right button signal. If the touched position is located near a left side of the touch module 11, the button signal is a left button signal. Whereas, if the touched position is located near a right side of the touch module 11, the button signal generated by the triggering switch 12 is a right button signal. According to the button signal, a function of clicking a corresponding icon of the computer system is executed.

When the top surface 1123 of the protective cover 112 is no longer depressed by the user's finger, the linking module 13 is swung relative to the touch module 11 in response to the bending elasticity of the metallic material of the linking body 131, which is fixed on the base member 10. Under this circumstance, the triggering part 135 is separated from the triggering switch 12, so that the triggering switch 12 is no longer pushed by the triggering part 135. Moreover, as the linking module 13 is swung, the plural movable pads 14 are moved relative to the corresponding perforations 101 of the base member 10. Consequently, the plural movable pads 14 are returned to their original positions where the touch module 11 is not depressed.

During the swinging process of the linking body 131, the fixing part 134 is used as the fulcrum, and the force-bearing point is located at the first movable pad 141 or the second movable pad 142. That is, the level arm of swinging the second side 1315 of the linking body 131 is equal to the distance D between the first movable pad 141 (or the second movable pad 142) and the fixing part 134 (see FIG. 5). More especially, this distance D is longer than the lever arm of swinging the foot bar of the conventional touch input device. As known, the magnitude of a torque is equal to the product of the magnitude of a force and the length of a lever arm. Since the distance D is relatively larger, the triggering switch 12 can be triggered without the need of applying a large force on the touch module 11. Consequently, the operation of the touch input device saves energy.

Moreover, in the touch input device 1, the triggering switch 12 is disposed on the base member 10. That is, the triggering switch 12 is not disposed on a lower portion of the touch module 11. Moreover, the linking body 131 is arranged between the triggering switch 12 and the touch module 11. That is, the triggering switch 12 and the touch module 11 are separated from each other by the linking body 131. When the touch module 11 is depressed by the user, the sound box effect generated in response to the depressing action is destroyed by the linking body 131, and thus the collision sound is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch input device with a button function, the touch input device comprising:
    a base member comprising plural perforations, wherein the plural perforations are located at a bottom side of the base member;
    a touch module disposed over the base member and covering the base member, wherein when the touch module is touched and a touched position is detected by the touch module, the touch module generates a touch signal;
    a triggering switch disposed on the base member, wherein when the touch module is depressed, the triggering switch is triggered to generate a corresponding button signal;
    a linking module disposed on the base member, wherein when the touch module is depressed, the linking module is swung relative to the touch module to trigger the triggering switch; and
    plural movable pads disposed on the linking module, and penetrated through the corresponding perforations of the base member to be exposed outside the base member, wherein when the touch module is depressed, the plural movable pads are moved relative to the corresponding perforations to push the linking module, so that the linking module is correspondingly swung.

2. The touch input device according to claim 1, wherein the linking module comprises:
    a linking body having a first opening, wherein the first opening is located at a middle region of the linking body;
    a first wing part located at a first side of the linking body, and extended along a first direction, wherein a first movable pad of the plural movable pads is disposed on the first wing part;
    a second wing part located at the first side of the linking body, and extended along a second direction, wherein a second movable pad of the plural movable pads is disposed on the second wing part;
    a fixing part disposed on the linking body, and penetrated through the first opening, so that the middle region of the linking body is fixed on the base member, wherein when the touch module is depressed, the first wing part is pushed by the first movable pad or the second wing part is pushed by the second movable pad, and a second side of the linking body is swung relative to the touch module by using the fixing part as a fulcrum.

3. The touch input device according to claim 2, wherein the triggering switch is located near the second side of the linking body, wherein when the touch module is depressed, the second side of the linking body is swung relative to the touch module by using the fixing part as the fulcrum, so that the triggering switch is pushed by the second side of the linking body.

4. The touch input device according to claim 3, wherein the linking module further comprises a triggering part, wherein the triggering part is disposed on the second side of the linking body, and extended from the linking body in a direction toward the triggering switch, wherein when the second side of the linking body is swung relative to the touch module, the triggering switch is pushed by the triggering part.

5. The touch input device according to claim 3, wherein the linking module further comprises a triggering part, wherein the triggering part is disposed on the second side of the linking body and penetrated through a second opening of the linking body, so that the triggering part is fixed on the second side of the linking body, wherein when the second side of the linking body is swung relative to the touch module, the triggering switch is pushed by the triggering part.

6. The touch input device according to claim 2, wherein the first wing part and the second wing part are integrally formed with the linking body, wherein the linking body is fixed on the base member by the fixing part through screws.

7. The touch input device according to claim 2, further comprising plural fixed pads, wherein the plural fixed pads are disposed on the touch module and respectively penetrated through the corresponding perforations of the base member to be exposed outside the base member, wherein when the base member is placed on a working surface, the plural fixed pads are contacted with the working surface, wherein when the touch module is depressed, the first movable pad or the second movable pad is pushed by the working surface to be moved relative to the corresponding perforations, and the second side of the linking body is pushed by the first movable pad or the second movable pad, so that the second side of the linking body is swung relative to the touch module to push the triggering switch.

8. The touch input device according to claim 1, wherein the touch module comprises:
   a sensing circuit plate for detecting the touched position, thereby generating the touch signal; and
   a protective cover for covering the sensing circuit plate, thereby protecting the sensing circuit plate, wherein a bottom surface of the sensing circuit plate is partially exposed outside the protective cover.

9. The touch input device according to claim 8, wherein when the touch module is depressed and the touched position is detected by the sensing circuit plate, the sensing circuit plate determines whether the button signal corresponding to the touched position is a left button signal or a right button signal, wherein if the touched position is located near a left side of the touch module, the button signal is the left button signal, wherein if the touched position is located near a right side of the touch module, the button signal is the right button signal.

10. The touch input device according to claim 8, wherein the protective cover further comprises plural protrusion posts, wherein the plural protrusion posts are disposed on a lower portion of the protective cover and protruded externally from the lower portion of the protective cover, wherein the plural fixed pads are disposed on the plural protrusion posts, respectively.

* * * * *